United States Patent
Kasamatsu et al.

(10) Patent No.: US 6,548,208 B1
(45) Date of Patent: Apr. 15, 2003

(54) NON-AQUEOUS ELECTROLYTE SECONDARY BATTERY AND ITS NEGATIVE ELECTRODE (75) Inventors: Shinji Kasamatsu, Osaka (JP); Harunari Shimamura, Osaka (JP); Yoshiaki Nitta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,277

(22) PCT Filed: Mar. 29, 2000

(86) PCT No.: PCT/JP00/01924
§ 371 (c)(1),
(2), (4) Date: Jan. 22, 2001

(87) PCT Pub. No.: WO00/60681
PCT Pub. Date: Oct. 12, 2000

(30) Foreign Application Priority Data

Mar. 31, 1999 (JP) ............................................. 11-092575

(51) Int. Cl.[7] .............................................. H01M 10/24
(52) U.S. Cl. .................. 429/218.1; 429/231.95
(58) Field of Search .................. 429/218.1, 231.95, 429/231.8, 231.5, 231.3, 231.1, 229, 220, 222, 223, 224

(56) References Cited

FOREIGN PATENT DOCUMENTS

| JP | 7-240201 | 9/1995 |
| JP | 9-63651 | 3/1997 |
| JP | 10-83817 | 3/1998 |
| JP | 10-125309 | 5/1998 |
| JP | 10-302770 | 11/1998 |
| JP | 10-308208 | 11/1998 |
| JP | 2000-30703 | 1/2000 |

OTHER PUBLICATIONS

International Search Report corresponding to application No. PCT/JP00/01924 dated Jun. 20, 2000.

Primary Examiner—Patrick Ryan
Assistant Examiner—M. Wills
(74) Attorney, Agent, or Firm—RatnerPrestia (57) ABSTRACT

A high capacity negative electrode for a non-aqueous electrolyte secondary battery which has low declining rate in discharge capacity caused by charge/discharge cycles by improving the electronic conductivity on the surface of the particles of the negative electrode material. The negative electrode material is formed by coating part of or the entire surface of solid phase A comprising a nucleus particle with the solid phase B. The solid phase A contains silicon as a constituent element. The solid phase B is composed of a solid solution or intermetallic compounds composed of silicon and at least one another element selected from a group comprising of group 2 elements, transition elements, group 12 elements, group 13 elements and group 14 elements (exclusive of carbon and silicon) of the Periodic Table.

13 Claims, 2 Drawing Sheets

NON-AQUEOUS ELECTROLYTE SECONDARY BATTERY AND ITS NEGATIVE ELECTRODE

THIS APPLICATION IS A U.S. NATIONAL PHASE APPLICATION OF PCT INTERNATIONAL APPLICATION PCT/JP00/01924.

FIELD OF THE INVENTION

The present invention relates to a negative electrode of a non-aqueous electrolyte secondary battery (hereinafter, referred to as "secondary battery") whose electrochemical properties such as the charge/discharge capacity and charge/discharge cycle life have been enhanced by improvements in negative electrode materials. The present invention further relates to a secondary battery using the same.

BACKGROUND OF THE INVENTION

In recent years, lithium secondary batteries using non-aqueous electrolytes, which are used in such fields as mobile communications devices including portable information terminals and portable electronic devices, main power sources of portable electronic devices, small domestic electricity storing devices, motor cycles using an electric motor as a driving source, electric cars and hybrid electric cars, have characteristics of a high electromotive force and a high energy density.

When a high-capacity lithium metal is used as a negative electrode material of a secondary battery, dendritic deposits of metal are formed on the negative electrode during charging. Over repeated charge/discharge cycles, these dendritic metal deposits penetrate through separators to the positive electrode, causing an internal short circuit. Furthermore, reactivity of the deposited lithium is high since they have a large specific surface area. Therefore, the dendrites react with solvents in the electrolytic solution on their surfaces, and form a surface film similar to a solid electrolyte which has no electronic conductivity. This raises the internal resistance of the batteries, causing some particles to be excluded from the network of the electronic conduction, thereby lowering the charge/discharge efficiency of the battery. For these reasons, the lithium secondary batteries using lithium metal for a negative electrode material suffer a low reliability and a short cycle life.

Nowadays, lithium secondary batteries which use carbon materials capable of intercalating and deintercalating lithium ions, are commercially available. In general, lithium metal does not deposit on carbon negative electrodes. Thus, short circuits are not caused by dendrites. However, the theoretical capacity of graphite which is one of the currently available carbon materials, is 372 mAh/g, only one tenth of that of pure Li metal.

Other known negative electrode materials include metallic materials and non-metallic materials which form composites with lithium. For example, the composition formula of compounds of silicon (Si) with the maximum amount of lithium is $Li_{22}Si_5$. Within the range of this composition formula, metallic lithium does not normally deposit to form dendrites. Thus, an internal short circuit due to dendrite formation does not occur. Furthermore, the electrochemical capacity between the compound and each element is 4199 mAh/g, larger than the theoretical capacity of graphite.

As other compound negative electrode materials, the Japanese Patent Laid Open Publication No. H07-240201 discloses a non-iron metal siliside comprising transition elements. The Japanese Patent Laid Open Publication No. H09-63651 discloses a siliside with a fluorite structure.

Although many materials enjoy a capacity higher than carbon material, they have the following problems.

The charge/discharge cycle properties of the negative electrode material comprising pure silicon are inferior to carbon negative electrode materials. The reason for this is assumed to be the destruction of the negative electrode materials caused by their volume expansion and shrinkage.

On the other hand, non-iron metal silisides comprising transition elements and fluorite structure silisides have been proposed by the Japanese Patent Laid Open Publication No. H07-240201 and the Japanese Patent Laid Open Publication No. H09-63651, as a negative electrode material with improved life cycle properties. But, they have following problems.

The capacities of the battery using non-iron metal silisides comprising transition elements as a negative electrode material is estimated from examples and a comparative example. At the first cycle, the fiftieth cycle and the hundredth cycle the batteries of the invention have improved charge/discharge cycle properties compared with lithium metal negative electrode materials. However, when compared with a negative electrode material of natural graphite, the increase in the capacity of the battery is only about 12%.

The materials disclosed in the Japanese Patent Laid Open Publication No. H09-63651 have a better charge/discharge cycle property than a Li—Pb alloy negative electrode material according to an example and a comparative example. The materials also have a larger capacity compared with a graphite negative electrode material. However, the discharge capacity decreases significantly up to the 10~20th charge/discharge cycles. The discharge capacity lowers to approximately 70% or less of the initial capacity after about the 20th cycle. Thus, their charge/discharge properties are inferior.

Considering the foregoing problems, the inventors have proposed a negative electrode material in which particle of pure silicon or silicon compounds, a high capacity material (hereinafter, nucleus particle) is coated with a layer of a solid solution or an intermetallic compound comprising silicon (hereinafter, coating layer), in the Japanese Patent Laid Open Publication No. 2000-30703. In the case of this negative electrode material, changes in volume occurring during charge and discharge of the nucleus particle are absorbed and moderated by the coating layer. Thus, compared with the negative electrode material using only pure silicon or silicon compounds, the expansion of the material is drastically reduced.

However, the nucleus particle of the negative electrode material is not always completely covered with the coating layer. In some cases, part of the nucleus particle, for example, a pure silicon is exposed to the surface of the negative electrode material. As the electronic conductivity of pure silicon is very low compared with the coating layer, the electronic conductivity of the particle as a whole becomes low. This further worsens when the number of particles which do not contribute to the electrochemical reaction is increased by the pulverization caused by repeated charge/discharge cycles.

Considering the aforementioned problems, the present invention aims at providing a high-capacity secondary battery with improved charge/discharge cycle properties, and a negative electrode for such a secondary battery by using the new high-capacity negative electrode material mentioned above, and by improving their electronic conductivity.

SUMMARY OF THE INVENTION

The negative electrode for the non-aqueous electrolyte secondary battery is constructed such that; part of or the entire surface of a particle including at least silicon is coated with;

a) a solid solution composed of silicon and at least one element selected from a group comprising group 2 elements, transition elements, group 12 elements, group 13 elements and group 14 elements exclusive of carbon and silicon of the Periodic Table; or b) an intermetallic compound composed of silicon and at least one element selected from a group comprising group 2 elements,-transition elements, group 12 elements, group 13 elements and group 14 elements exclusive of carbon and silicon of the Periodic Table. Part of or the entire surface of the particle coated with the solid solution or intermetallic compounds is coated with a conductive material.

This construction allows the negative electrode material to enjoy an improved electronic conductivity so that the charge/discharge cycle properties of the secondary battery are improved.

DETAILED DESCRIPTION OF THE INVENTION

As a negative electrode material used in the present invention, composite particles, whose nucleus particles composed of solid phase A are coated with solid phase B over part of or the entire surface, are used. The solid phase A contains at least silicon as a constituent element. The solid phase B is composed of a solid solution or intermetallic compounds composed of silicon and at least one different constituent element selected, as a constituent element, from a group comprising group 2 elements, transition elements, group 12 elements, group 13 elements and group 14 elements (exclusive of carbon and silicon) of the Periodic Table. The negative electrode material is coated in part or on the entire surface with a conductive material.

The phase A contains silicon, a high-capacity material, as a constituent element. Thus it contributes to a higher discharge capacity. The phase B which coats part of or the entire surface of the nucleus particles comprising the solid phase A, helps to restrict expansion and shrinkage of the solid phase A caused by charging and discharging, contributing to improve charge/discharge cycle properties.

The reason why part of or the entire surface of the negative electrode material is coated with the conductive material is as follows.

In general, during intercalation and de-intercalation of lithium, the movement of electrons between the negative electrode material and the current collector is done by adding conductive agents to the negative electrode. However, when the conductive materials are simply added to the negative electrode material, the negative electrode material and the conductive materials come into contact only at the particle level, thus failing to achieve a sufficient contacting area.

On the other hand, the materials containing silicon as a constituent element, for example pure silicon which forms the solid phase A, have a very low electronic conductivity.

In the case of such negative electrode material, the solid phase A is sometimes exposed to the surface. Therefore, if the contacting area between the conductive materials and the negative electrode material is too small, the conductive materials sometimes fail to contact with pure silicon, thereby prohibiting a smooth movement of the electrons. When the pulverization of the composite particles occurs over the repeated charge/discharge cycles, the conditions of contact between the negative electrode material and the conducting materials gradually declines, and the effect of existence of the solid phase A with a low electronic conductivity becomes to be conspicuous.

According to the present invention, the negative electrode material and the conductive materials are not simply mixed but the surface of the negative electrode material is covered with the conductive materials, in other words, the part of the solid phase A exposed to the surface is coated with a material with a high electronic conductivity. In this way, a desirable electronic conductivity network can be formed between the negative electrodes even when the electronic conductivity of the solid phase A is low. Even when the particles are pulverized over repeated charge/discharge cycles, influence on charge/discharge cycle properties is mitigated since network of electronic conduction is formed more desirably than the conventional simple mixture of the negative electrode and conductive materials.

As a conductive material, any electronically conductive material having high conductivity can be used, however, carbon and metallic materials are preferable. Examples of such materials include graphite materials including natural graphite (scale-like graphite) synthetic graphite and expanding graphite amorphous carbon materials such as acethylene black, high-structure carbon black such as Ketzen black (registered trademark of highly structured furnace black), and carbon blacks such as channel black, furnace black, lamp black and thermal black. Among these conductive materials, scale-like natural graphite, synthetic graphite, expanding graphite, acetylene black and Ketzen black are especially favorable. Graphite in which distances between carbon layers (d002) is not less than 0.335 nm and not more than 0.339 nm are superior in terms of electronic conductivity, thus preferable, where the distance is calculated using wide angle X-ray diffraction analysis. The median diameter of the graphite particles is preferably not more than 30 $\mu$m, and preferably not more than 20 $\mu$m.

Metallic materials suitable for the conductive materials include nickel, cobalt, copper, manganese, iron, platinum, gold, silver and palladium. Among these materials, nickel, cobalt and copper are preferable. The median diameter of the metallic material particles is preferably not more than 20 $\mu$m, and preferably not more than 10 $\mu$m. Even fine-particle metallic materials of median diameter of not more than 1 $\mu$m can also be used.

The conductive materials can be used alone or as a mixture of more than two. Further, use of an organic conductive material such as polyphenylene derivatives has the same effect.

The covering rate of the conductive material to the total surface area of the negative electrode material of the present invention is preferably not less than 20%. When the covering rate is 20% or more, the effect of the coating according to the present invention is enhanced. The thickness of the conductive material is between 0.01 $\mu$m and 10 $\mu$m. When it is thinner than 0.01 $\mu$m, the electronic conductivity lowers, and when it is over 10 $\mu$m, the diffusion rate of lithium ions into the negative electrode material lowers.

According to the present invention, when a battery is manufactured using the negative electrode material comprising the aforementioned materials, and surface of which is coated with the conductive material, it enjoys a higher capacity and superior cycle properties can be achieved.

The battery of the present invention comprises a non-aqueous electrolyte, positive and negative electrodes capable of intercalating and de-intercalating lithium.

The following is a description of a manufacturing method of the negative electrode material of the present invention.

The above negative electrode material comprises solid solution or intermetallic compounds. The constituent elements are mixed at a predetermined proportion and fused at high temperatures. The fused mixture is quenched and solidified by dry-spraying, roll-quenching or turning-electrode method. If necessary, diameters of the particles are adjusted by pulverizing and classification. If the particles are treated at a temperature lower than the solid phase line temperature corresponding to the composition ratio of their constituent elements, shown in the phase diagram, a favorable structure of solid solution or intermetallic compound is obtained.

The above process of quenching and solidifying of the fused mixture allows the solid phase B to deposit on part of or the entire surface of the solid phase A and cover it to obtain the negative electrode material. The following heat treatment enhances evenness of the solid phase A and the solid phase B. Even when the heat treatment is not conducted, the negative electrode materials can be obtained. Quenching and solidifying methods are not limited to the forgoing method.

Another example of manufacturing method of the negative electrode material is described below.

On the surface of the powder comprising the solid phase A, an objective product, a layer comprising the constituent elements of the solid phase B excluding the constituent elements of the solid phase A is deposited. Subsequently, the particles are treated at a temperature lower than the solid phase line temperature corresponding to the composition ratio of their constituent elements, shown in the phase diagram, a favorable structure of solid solution or intermetallic compound is achieved. This heat treatment allows constituent elements within the solid phase A to diffuse throughout the deposit layer to form the composition for the solid phase B.

The deposit layer can be formed by plating or by a mechanical alloying method. In the case of the mechanical alloying method, the heat treatment is not required to obtain the negative electrode material. Depositing methods are not limited to the above.

As a method of coating the conductive materials onto the negative electrode, mechano-chemical reaction is used. In this method, mechanical energy of pressing and milling power is applied in between the negative electrode material and the conductive material with a press-milling pulverizer to mill and coat the conductive material on the surface of the negative electrode material.

Practical methods for mechano-chemical reaction include hybridyzation method (Nara Machine Co.), Mechano-fusion method (Hosokawa Micron), theta composer method (Tokuju Co.) mechano-milling method, and boll-milling method. Other coating methods include a CVD method in which organic materials are thermally decomposed, a plasma method in which coating layer is formed on the negative electrode material, and carbonization method in which organic material is coated on the negative electrode material and then carbonized at 700~1400° C.

When the mechano-chemical reaction is used, mechanical energy comprising pressing and milling power is applied, thus, due to frictional heat, surface of the negative electrode material becomes temporarily high energy state. Since the conductive material is coated on the surface in that state, the negative electrode material and the conductive material are strongly fixed.

The negative electrode of the battery of the present invention can be made by coating a electrode mixture comprising conductive materials and binders on the current collector.

The conductive materials are used mixed with the negative electrode materials, and they can be any electronic conductive material. Since the negative electrode material of the present invention is coated with the conductive material, the battery can function without adding the conductive materials to the negative electrode materials.

As a electronic conductive material for the negative electrode, any electronic conduction materials can be used. Examples of such materials include graphite materials including natural graphite (scale-like graphite) synthetic graphite and expanding graphite; carbon black materials such as acethylene black, Ketzen black (registered trademark of highly structured furnace black), channel black, furnace black, lamp black and thermal black; conductive fibers such as carbon fibers and metallic fibers; metal powders such as copper and nickel; and organic conductive materials such as polyphenylene derivatives. These materials can be used independently or in combination. Among these conductive materials, synthetic graphite, acetylene black and carbon fibers are especially favorable. The total amount of the additives is not specifically defined, however, 1–50 wt %, especially 1–30% of the negative electrode materials is desirable.

Binders for the negative electrode can be either thermoplastic resin or thermosetting resin. Desirable binders for the present invention includes the following materials; polyethylene, polypropylene, polytetrafluoroethylene (PTFE), polyvinylidene fluoride (PVDF), styrene-butadiene rubber, a tetrafluoroethylene-hexafluoropropylene copolymer (FEP), a tetrafluoroethylene-perfluoroalkyl vinyl ether copolymer (PFA), a vinyliden fluoride-hexafluoropropylene copolymer, a vinyliden fluoride-chlorotrifluoroethylene copolymer, a ethylene-tetrafluoroethylene copolymer (ETFE), poly chlorotrifluoroethylene (PCTFE), a vinyliden fluoride-pentafluoropropylene copolymer, a propylene-tetrafluoroethylene copolymer, a ethylene-chlorotrifluoroethylene copolymer (ECTFE), a vinyliden fluoride-hexafluoropropylene-tetrafluoroethylene copolymer, a vinyliden fluoride perfluoromethyl vinyl ether-tetrafluoroethylene copolymer, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylenemethyl methacrylate copolymer or its Na+ ion crosslinking body. Favorable materials among these materials are styrene butadiene rubber, polyvinylidene fluoride, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylenemethyl methacrylate copolymer or its Na+ ion crosslinking body.

As a current collector for the negative electrode, any electronic conductor can be used on the condition that it does not chemically change in the battery. For example, stainless steel, nickel, copper, titanium, carbon, conductive resin, as well as copper and stainless steel whose surfaces are coated with carbon, nickel or titanium can be used. Especially favorable materials are copper and copper alloys. Surfaces of these materials can be oxidized. It is desirable to treat the surface of the current collector to make it uneven. Usable forms of the foregoing materials as the current collector include a foil, a film, a sheet, a mesh sheet, a punched sheet, a lath form, a porous form, a foamed form and a fibrous form. The thickness is not specifically defined however, normally those of 1–500 $\mu$m in thickness are used.

The positive electrode of the present invention is produced by coating a current collector with a electrode mixture including conductive materials, binders and the positive electrode materials capable of intercalating and de-intercalating lithium ions electrochemically and reversibly.

As positive electrode active materials, lithium compounds or non-lithium compounds can be used. Such compounds include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one of Na, Mg, Sc, Y, Mn, Fe, Co, Ni, Cu, Zn, Al, Cr, Pb, Sb and B, and x=0~1, Y=0~0.9, z=2.0~2.3). The value of x is the value before charging and discharging, thus it changes along with charging and discharging. Other usable positive electrode materials include transition metal chalcogenides, a vanadium oxide and its lithium compounds, a niobium oxide and its lithium compounds, a conjugate polymer using organic conductive materials, and shevril phase compounds. It is also possible to use a plurality of different positive electrode materials in a combined form. The average diameter of particles of the positive electrode active materials is not specifically defined, however, desirably it is 1–30 $\mu$m.

Conductive materials for the positive electrode can be any electronic conduction material on the condition that it does not chemically change within the range of charge and discharge electric potentials of the positive electrode materials in use. Examples of such materials include graphite materials including natural graphite (scale-like graphite) and synthetic graphite; carbon black materials such as acethylene black, Ketzen black, channel black, furnace black, lamp black and thermal black; conductive fibers such as carbon fibers and metallic fibers; fluorinated carbon; metal powders such as aluminum; conductive whiskers such as a zinc oxide and potassium titanate, conductive metal oxides such as a titanium oxide, and organic conductive materials such as polyphenylene derivatives. These materials can be used independently or in combination. Among these conductive materials, synthetic graphite and acetylene black are especially favorable.

The total amount of the conductive materials to be added is not specifically defined, however, 1–50 wt %, especially 1–30 wt % of the positive electrode materials is desirable. In the case of carbon and graphite, 2–15 wt % is especially favorable.

Binders for the positive electrode can be either thermoplastic resin or thermosetting resin. The binders for the negative electrode mentioned earlier can be used effectively, however, PVDF and PTFE are more preferable.

Current collectors for the positive electrode of the present invention can be any electronic conductive material on the condition that it does not chemically change within the range of charge and discharge electric potentials of the positive electrode materials in use. For example, the current collectors for the negative electrode mentioned earlier can be used effectively. The thickness of the current collectors is not specifically defined, however, those of 1–500 $\mu$m in thickness are used.

As electrode mixtures for the positive electrode and the negative electrode plates, conductive materials, binders, fillers, dispersants, ionic conductors, pressure enhancers, and other additives can be used. Any fiber material, which does not change chemically in the battery, can be used as fillers. In general, olefin polymers such as polypropylene and polyethylene, and fibers such as glass fiber and carbon fiber are used as fillers. The amount of the filler to be added is not specifically defined however, it is desirably 0–30 wt % of the electrode binders.

As for the construction of the positive electrode and the negative electrode, it is favorable that at least the surfaces of the negative electrode and the positive electrode where there are the electrode mixture layer are facing each other.

The non-aqueous electrolytes used in the battery of the present invention comprises non-aqueous solvents and lithium salts dissolved in them.

Examples of non-aqueous solvents include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); aliphatic carboxylates such as methyl formate, methyl acetate, methyl propionate, and ethyl propionate; γ-lactones such as γ-butyrolactone (GBL); acyclic ethers such as 1,2-dimethoxyethane (DME), 1,2-diethoxyethane (DEE), and ethoxymethoxyethane (EME); cyclic ethers such as tetrahydrofuran and 2-methyltetrahydrofuran; and non-protonic organic solvents such as dimethyl sulfoxide, 1,3-dioxolane, formamide, acetamide, dimethylformamide, dioxolane, acetonitrile, propylnitrile, nitromethane, ethylmonoglime, triester phosphate, trimethoxymethyne, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesaltane, anisole, dimethyl sulfoxide and N-methylpyrolidon, These solvents are used independently or as a mixture of two or more solvents. Mixtures of cyclic carbonate and acyclic carbonate, or cyclic carbonate, acyclic carbonate and aliphatic carboxylate are especially favorable.

Lithium salts which dissolve into the foregoing solvents include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic carboxylic lithium, LiCl, LiBr, LiI, chloroboron lithium, 4-phenil boric acid, and an imide group. These lithium salts can be dissolved individually or as a mixture of two or more in the non-aqueous solvents mentioned earlier, and used as an electrolytic solution. It is especially favorable to include $LiPF_6$ in the electrolytic solution.

Especially favorable non-aqueous electrolytic solutions of the present invention include at least EC and EMC, and as a supporting salt, $LiPF_6$. The amount of the electrolytic solution to be added to the battery is not specifically defined. Considering the amount of the positive electrode and the negative electrode materials and the size of the battery, the required amount can be used. The amount of the supporting electrolytes against the no-aqueous solvents is not specifically defined, however, 0.2–2 mol/l, especially 0.5–1.5 mol/l is preferable.

Instead of an electrolytic solution, the following solid electrolytes, which are categorized into inorganic solid electrolytes and organic solid electrolytes, can also be used. Lithium nitrides, lithium halides, and lithium oxides are well known inorganic solid electrolytes. Among them, $Li_4SiO_4$, $Li_4SiO_4$-LiI-LiOH, $xLi_3PO_4$-$(1-x)Li_4SiO_4$, $Li_2SiS_3$, $Li_3PO_4$-$Li_2S$-$SiS_2$ and phosphorus sulfide compounds are effectively used. As organic solid electrolytes, polymer materials such as polyethylene oxides, polypropylene oxides, polyphosphazene, polyaziridine, polyethylene sulfides, polyvinyl alcohol, polyvinylidene fluorides, polyhexafluoropropylene and their derivatives, mixtutres and complexes are effectively used.

It is effective to add other compounds to the electrolytic solution in order to improve discharge and charge/discharge properties. Such compounds include triethyl phosphate, triethanolamine, cyclic ethers, ethylenediamine, n-grime, pyridine, triamide hexaphosphate, nitrobenzene direvatives, crown ethers, quaternary ammonium salt, and ethylene glycol dialkyl ether.

As a separator of the present invention, fine-porous thin films, which have a large ion permeability, a predetermined mechanical strength and insulation properties, are used. It is desirable that the pores of the separators close at or above a predetermined temperature to increase resistance. For the sake of an organic solvent resistance and a hydrophobic property, olefin polymers including polypropylene and polyethylene can be used individually or in combination. Sheets, non-wovens and wovens made from glass fiber can also be used. The diameter of the fine pores of the separators is desirably set within the range through whichno positive electrode and negative electrode materials, binding materials, and conductive materials separated from electrode sheets can pass through. A desirable range is, for example, 0.01–1 $\mu$m. The thickness of the separator is generally 10–300 $\mu$m. The porosity is determined by the permeability of electrons and ions, material and membrane pressure. In general, however, the porosity is desirably 30–80%.

It is also possible to construct a battery such that polymer materials, which absorb and retain an organic electrolytic solution comprising solvents and lithium salts dissolved in the solvents, are included in the electrode mixtures of the positive and negative electrodes, and porous separators, which comprise polymers capable of absorbing and retaining the organic electrolytic solution, are formed integrally with the positive and the negative electrode. As the polymer materials, any materials capable of absorbing and retaining organic electrolytic solutions can be adopted. Among such materials, a copolymer of vinylidene fluoride and hexafluoropropylene is especially favorable.

The battery of the present invention can be applied in any form including coins, buttons, sheets, laminates, cylinders, flat types, square types and large types used in electric cars.

The battery of the present invention can be used for portable information terminals, portable electronic devices, small domestic electricity storing devices, motor cycles, electric cars and hybrid electric cars. However, the application of the battery is not limited to the foregoing.

The present invention is now to be described in further details according to the examples. However, the present invention is not limited to the examples.

Manufacturing Method of the Negative Electrode Material

In Table 1, components (pure elements, intermetallic compounds, solid solution) of the solid phase A and the solid phase B of the composite particles used in the preferred embodiments of the present invention, composition ratios of elements, fusion temperatures, and solid phase line temperatures are shown.

To obtain solid materials, powder or a block of each element contained in the composite particles is put into a fusion vessel in the composition ratio shown in Table 1, and fused at the fusion temperature also shown in Table 1. The fused mixture is quenched by the roll-quenching method and solidified to form a solid material which is then heat treated at temperatures of 10° C.–50° C. lower than the solid phase line temperatures shown in Table 1, in an inert atmosphere for 20 hours. After being heat treated, the material is ground with a ball mill, and classified using a sieve to prepare composite particles of 45 $\mu$m or less. Observed under an electron microscope, these composite particles are confirmed to have part of or the whole surface of the solid phase A thereof covered with the solid phase B.

TABLE 1

| Negative electrode materials | Solid phase A | Solid phase B | Fusion temperature ° C. | Solid phase temperature ° C. | Composite ratio (atomic %) |
|---|---|---|---|---|---|
| material A | Si | $Mg_2Si$ | 1415 | 946 | Si:Mg = 70:30 |
| material B | Si | $CoSi_2$ | 1495 | 1259 | Si:Co = 85:15 |
| material C | Si | $NiSi_2$ | 1415 | 993 | Si:Ni = 96:31 |
| material D | Si | Si, Zn solid solution | 1415 | 420 | Si:Zn = 50:50 |
| material E | Si | Si, Al solid solution | 1415 | 577 | Si:Al = 40:60 |
| material F | Si | Si, Sn solid solution | 1415 | 232 | Si:Sn = 50:50 |

Coating Method of the Conductive Materials on the Negative Electrode

The conductive materials shown in Table 2 are coated on the materials A-F by the mechano-fusion method using a press-milling pulverizer (Hosokawa Micron).

Figure 1:
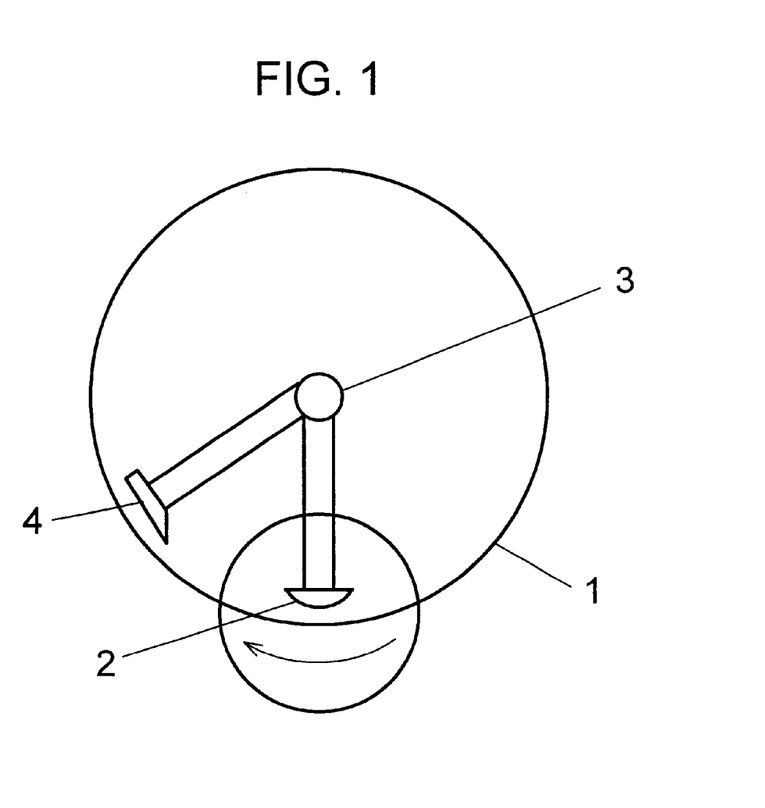
FIG. 1 is a schematic view showing a construction of a press-milling pulverizer used in a coating process in preferred embodiments of the present invention.

FIG. 1 shows a schematic view of a press-milling pulverizer used in the mechano-fusion method. 180 g of the negative electrode materials and 20 g of conductive material are put in a casing 1 of the pulverizer. The rotation speed is 1800 rpm and processing time is 20 minutes. The distance between the casing 1 and action member 2 is 3 mm at the closest.

Coating mechanism of the milling device is briefly described below. The casing 1 rotates rapidly revolving around a fixed shaft 3. Centrifugal force generated by the rotation pushes the mixture of the negative electrode materials and the conductive materials against an outer wall of the casing 1. Pressure generated by the action member 2 is applied on the mixture formed on an inner wall of the casing 1. Compression and milling force is generated to mill and coat the surface of the negative electrode materials with the conductive materials.

The sample is prepared in the foregoing manner in which the negative electrode materials are coated with the conductive materials. As the conductive materials, natural graphite (Kansai Heat Chemical NG-7), synthetic graphite (Timcal KS6), acethylene black (Electrochemical Industry Co.) Ketzen black (Lion Co.), nickel ultra fine powder (Vacuum Metallurgy Co.), cobalt powder (Vacuum Metallurgy Co.) and copper powder (Highly-Purity Chemicals Co.) are used.

Manufacturing Method of the Test Cell

The testing method of the negative electrode used for the evaluation of the negative electrode for batteries is now described. A coin-type test cell of R2016 size (20.0 in diameter, 1.6 mm in the total height) shown in FIG. 2 is prepared to measure the electrochemical properties of the negative electrode materials such as the charge/discharge capacity.

Figure 2:
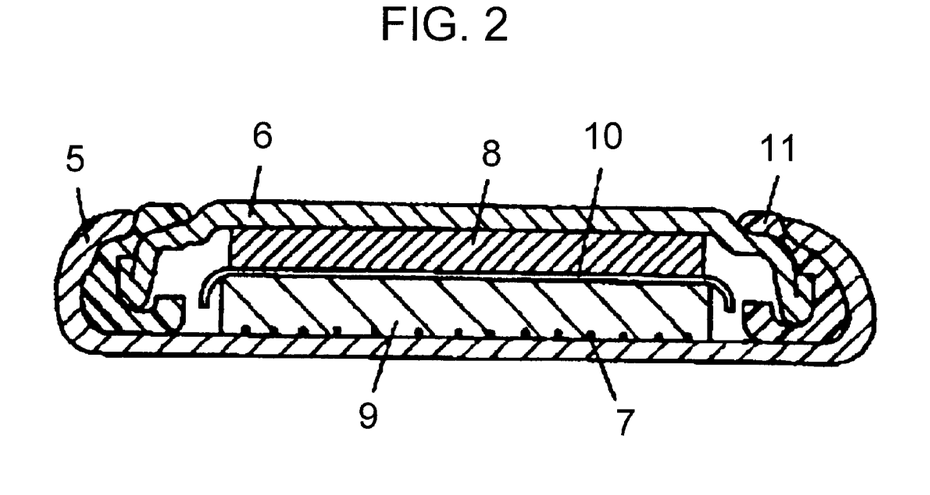
FIG. 2 is a cross section of a test battery used to evaluate negative electrodes for the battery of the present invention.

In FIG. 2, the gap between a cell case 5 and a cover 6 is sealed tightly via a gasket 11 made with polypropylene.

A negative electrode material mold electrode 9 is integrally formed with current collector 7 made of stainless steel expand metal welded on the inner bottom of the battery case 5. On the inner face of the cover 6 is a disk-type lithium metal electrode 8 pressed and fixed.

Separators 10 made with porous polypropylene film separate the negative electrode material mold electrode 9 from the lithium metal electrode 8. A space between the electrodes, a negative electrode material mold electrode 5 and the separators 10 are impregnated with an organic electrolytic solution.

The negative electrode material mold electrode 9 is formed such that a negative electrode material powder coated with the conductive materials of the present invention, synthetic graphite (KS6) as a conductive material and polyvinylidene fluoride as a binder are mixed at a predetermined proportion. The mixture is then molded integrally on the current collector 7. After molding, the negative electrode material mold electrode 9 is dried in vacuo at 80° C., and the test cell is assembled.

As an organic electrolytic solution, 1 mol/l of lithium phosphate hexafluoride, an electrolyte, is dissolved into a mixed solution of EC and DEC mixed equally by volume.

The Charge/Discharge Cycle Test

The test cells are charged at a constant current of 0.5 mA/cm$^2$ in current density until their voltage becomes 4.2V, and then discharged at a constant current of 0.5 mA/cm$^2$ in the current density until their voltage becomes 3.0V. The charge/discharge cycle is repeated under this condition until 300th cycle in a temperature controlled oven at 20° C. The ratio of the discharge capacity at the 300th cycle to that of the first cycle is calculated to obtain the capacity retention rate. Charge and discharge here is the same as those of a real battery. In other words, the intercalation and deintercalation reactions of lithium of the negative electrode are respectively defined as charging and discharging.

EXAMPLE 1

A battery is formed using a negative electrode comprising a binder and a electrode material produced by coating the material A in Table 1 with synthetic graphite by the mechano-fusion method. For comparison, a battery is prepared with a negative electrode in which the material A is not coated with a conductive material, instead, synthetic graphite is simply added as a conductive material along with a binder. Their capacity retention rates at charge/discharge are compared. In the case of Example 1, the capacity retention rate is 71%, and the comparative Example, 61%.

The negative electrode materials whose surface is coated with conductive material provide a superior capacity retention rate and cycle properties to the materials using synthetic graphite as a conductive material. The negative electrode mixture of Example 1 is prepared such that the ratio of the components, namely, the negative electrode material, the conductive material and the binder, by weight is 85:10:5. In the case of the comparative Example, the ratio of the negative electrode material, the conductive material and binder by weight is 85:10:5.

EXAMPLE 2

Table 2 shows the capacity retention rates of the negative electrode of Example 2 in which the materials A-F in Table 1 are coated with conductive materials by mechano-fusion method and the negative electrode prepared for comparison without coating the negative electrode materials with a conductive material. The negative electrode mixture of Example 2 is prepared such that the ratio of the components, namely, the negative electrode material, the conductive material, the conductive material and the binder, by weight is 85:5:5:5. In the case of the comparative Example, the ratio of the negative electrode material, the conductive material and the binder by weight is 85:10:5.

TABLE 2

| Negative electrode material | Conductive material | Example 2 Capacity retention rate (%) | Comparative Example Capacity retention rate (%) |
|---|---|---|---|
| material A | natural graphite | 82 | 61 |
| material A | synthetic graphite | 86 | |
| material A | acetylene black | 83 | |
| material A | Ketzen black | 80 | |
| material A | nickel | 75 | |
| material A | cobalt | 73 | |
| material A | copper | 76 | |
| material B | natural graphite | 79 | 60 |
| material B | synthetic graphite | 85 | |
| material B | acetylene black | 82 | |
| material B | Ketzen black | 78 | |
| material B | nickel | 72 | |
| material B | cobalt | 72 | |
| material B | copper | 74 | |
| material C | natural graphite | 84 | 64 |
| material C | synthetic graphite | 87 | |
| material C | acetylene black | 84 | |
| material C | Ketzen black | 82 | |
| material C | nickel | 76 | |
| material C | cobalt | 76 | |
| material C | copper | 77 | |
| material D | natural graphite | 77 | 59 |
| material D | synthetic graphite | 84 | |
| material D | acetylene black | 79 | |
| material D | Ketzen black | 79 | |
| material D | nickel | 77 | |
| material D | cobalt | 74 | |
| material D | copper | 78 | |
| material E | natural graphite | 85 | 62 |
| material E | synthetic graphite | 88 | |
| material E | acetylene black | 84 | |
| material E | Ketzen black | 82 | |
| material E | nickel | 77 | |
| material E | cobalt | 74 | |
| material E | copper | 78 | |
| material F | natural graphite | 81 | 61 |
| material F | synthetic graphite | 86 | |
| material F | acetylene black | 82 | |
| material F | Ketzen black | 80 | |
| material F | nickel | 73 | |
| material F | cobalt | 71 | |
| material F | copper | 77 | |

Table 2 suggests that the negative electrode materials whose surface is coated with conductive material and also contain synthetic graphite as a conductive material provide a superior capacity retention rate and cycle properties to the negative electrode materials simply containing synthetic graphite as a conductive material without being coated with a conductive material. These improvements are attributed to the effects of the present invention in which the surface of the negative electrode materials is coated with the conductive materials so that the improved electrical connection allows electrons to move more smoothly.

EXAMPLE 3

In Example 3 material A is used, and differences in the capacity retention rate of batteries are observed by changing the the coating rate of synthetic graphite to the surface of the material A. The composition of the composite particles, namely the ratio of negative electrode material, the conductive material and the binder by weight is 90:5:5. The ratio of material A and synthetic graphite by weight is modified according to the coating rate so that the material A coated with synthetic graphite becomes 90% by weight of the total electrode mixture. The results are shown in FIG. 3.

Figure 3:
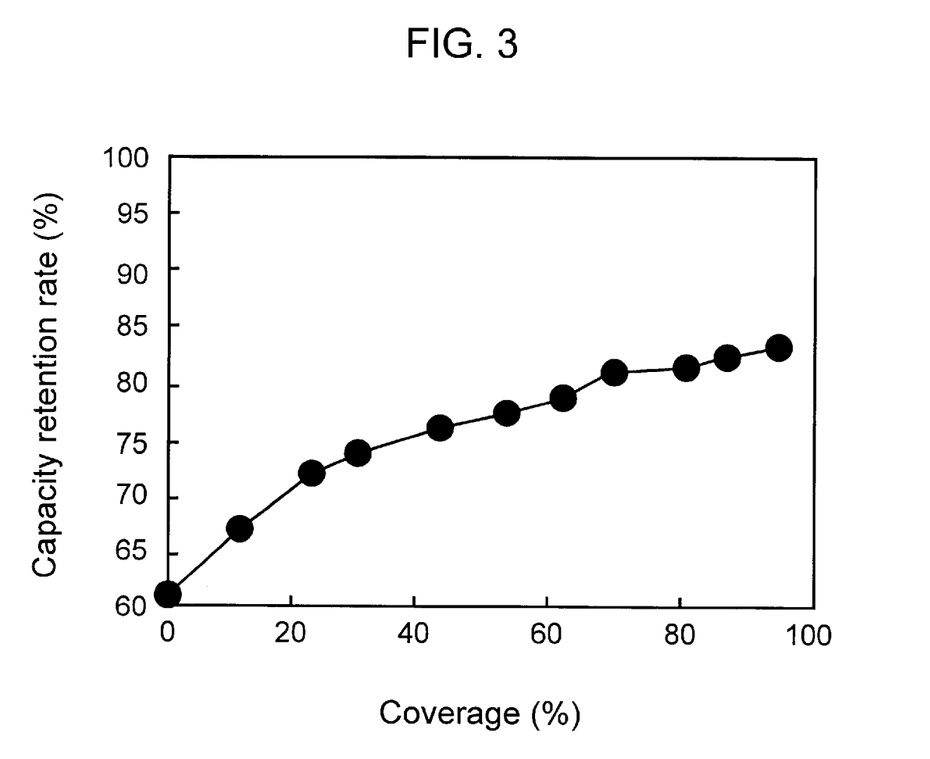
FIG. 3 is a chart showing retention rates of the negative electrode in accordance with the second example of the present invention.

As FIG. 3 shows, by coating the surface area of the material A by 20% or more, the charge/discharge cycle properties are improved. The result suggests that when the coating rate is 10% or less, the single-phase silicon, namely the solid phase A which is exposed to the surface of the negative electrode material, is not coated sufficiently in the particle level. Due to this, an optimum electron conductive network is not established, thus causing the charge/discharge efficiency to decline.

In Example 3, a coin-type battery is used for the test, however, a cylindrical battery and a laminate-type battery using polymer electrolytes show the same result.

As thus far described, a negative electrode and a secondary battery using the negative electrode which enjoy a lower rate of decline in the discharge capacity can be obtained by coating with the conductive material, part of or the entire surface of the negative electrode material in which part of or the entire surface of the nucleus particle comprising the solid phase A, a high-capacity material, is coated with the solid phase B.

The battery of the present invention can be applied in any form including coins, buttons, sheets, laminates, cylinders, flat types, square types and large types used in electric cars.

The battery of the present invention can be used for portable information terminals, portable electronic devices, small domestic electricity storing devices, motor cycles, electric cars and hybrid electric cars. However, the application of the battery of the present invention is not limited to the foregoing.

Industrial Applicability

The batteries using the composite particles for the negative electrode of the present invention have a higher capacity and superior charge/discharge cycle properties, high-rate charge/discharge properties and high-temperature storage properties. As such, the batteries of the present invention can be used in portable information terminals, portable electronic devices, small domestic electricity storing devices, motor cycles, electric cars and hybrid electric cars, thereby offering remarkable benefits when industrially applied.

What is claimed is:

1. A negative electrode for a non-aqueous electrolyte secondary battery using a negative electrode material in which; one of
   a) part of; and
   b) an entire surface of a particle containing at least silicon is coated with one of
      i) a solid solution composed of silicon and at least one element selected from a group consisting of group 2 elements, transition elements, group 12 elements, group 13 elements and group 14 elements exclusive of carbon and silicon of the Periodic Table; and
      ii) an intermetallic compound composed of silicon and at least one element selected from a group consisting of group 2 elements, transition elements, group 12 elements, group 13 elements and group 14 elements exclusive of carbon and silicon of the Periodic Table, wherein one of
      i) part of; and
      ii) an entire surface of said particle coated with one of the solid solution and intermetallic compound
   is coated with a conductive material.

2. The negative electrode for the non-aqueous electrolyte secondary battery of claim 1, wherein said conductive material is a carbon material.

3. The negative electrode for the non-aqueous electrolyte secondary battery of claim 2, wherein said carbon material is at least one of natural graphite, synthetic graphite and carbon black.

4. The negative electrode for the non-aqueous electrolyte secondary battery of claim 1, wherein said conductive material is metal.

5. The negative electrode for the non-aqueous electrolyte secondary battery of claim 4, wherein said metallic material is at least one of cobalt, nickel and copper.

6. The negative electrode for the non-aqueous electrolyte secondary battery of claim 1, wherein not less than 20% of the total surface area of said negative electrode material is coated with said conductive material.

7. The negative electrode for the non-aqueous electrolyte secondary battery of claim 1, wherein one of;
   a) part of; and
   b) an entire surface of said negative electrode material is coated with said conductive material by applying a mechanical energy comprising mainly pressing and milling power onto a mixture of said negative electrode material and said conductive material to press-mill and to coat said conductive material on the surface of said negative electrode material.

8. A non-aqueous electrolyte secondary battery comprising a negative electrode using a negative electrode material in which; one of
   a) part of and
   b) an entire surface of a particle including at least silicon is coated with one of
      i) a solid solution composed of silicon and at least one element selected from a group consisting of group 2 elements, transition elements, group 12 elements, group 13 elements and group 14 elements exclusive of carbon and silicon of the Periodic Table; and
      ii) an intermetallic compound composed of silicon and at least one element selected from a group consisting of group 2 elements, transition elements, group 12 elements, group 13 elements and group 14 elements exclusive of carbon and silicon of the Periodic Table, wherein one of
      i) part of; and
      ii) an entire surface
   of said particle coated with one of the solid solution and intermetallic compound
   is coated with a conductive material.

9. The negative electrode for the non-aqueous electrolyte secondary battery of claim 2, wherein one of;
   a) part of; and
   b) an entire surface of said negative electrode material is coated with said conductive material by applying a mechanical energy comprising mainly pressing and milling power onto a mixture of said negative electrode material and said conductive material to press-mill and to coat said conductive material on the surface of said negative electrode material.

10. The negative electrode for the non-aqueous electrolyte secondary battery of claim 3, wherein one of;
    a) part of; and
    b) an entire surface of said negative electrode material is coated with said conductive material by applying a mechanical energy comprising mainly pressing and milling power onto a mixture of said negative electrode material and said conductive material to press-mill and to coat said conductive material on the surface of said negative electrode material.

11. The negative electrode for the non-aqueous electrolyte secondary battery of claim 4, wherein one of;

a) part of; and b) an entire surface of said negative electrode material is coated with said conductive material by applying a mechanical energy comprising mainly pressing and milling power onto a mixture of said negative electrode material and said conductive material to press-mill and to coat said conductive material on the surface of said negative electrode material.

12. The negative electrode for the non-aqueous electrolyte secondary battery of claim 5, wherein one of;

a) part of; and b) an entire surface of said negative electrode material is coated with said conductive material by applying a mechanical energy comprising mainly pressing and milling power onto a mixture of said negative electrode material and said conductive material to press-mill and to coat said conductive material on the surface of said negative electrode material.

13. The negative electrode for the non-aqueous electrolyte secondary battery of claim 6, wherein one of;

a) part of; and b) an entire surface of said negative electrode material is coated with said conductive material by applying a mechanical energy comprising mainly pressing and milling power onto a mixture of said negative electrode material and said conductive material to press-mill and to coat said conductive material on the surface of said negative electrode material.

* * * * *